(No Model.) 2 Sheets—Sheet 1.
J. DOVER.
APPARATUS FOR AERATING MILK.
No. 469,500. Patented Feb. 23, 1892.
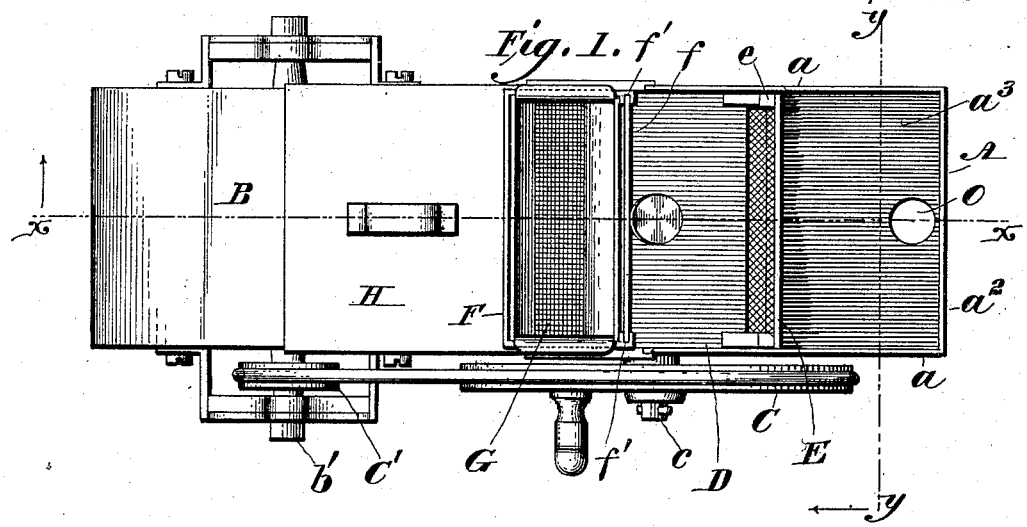
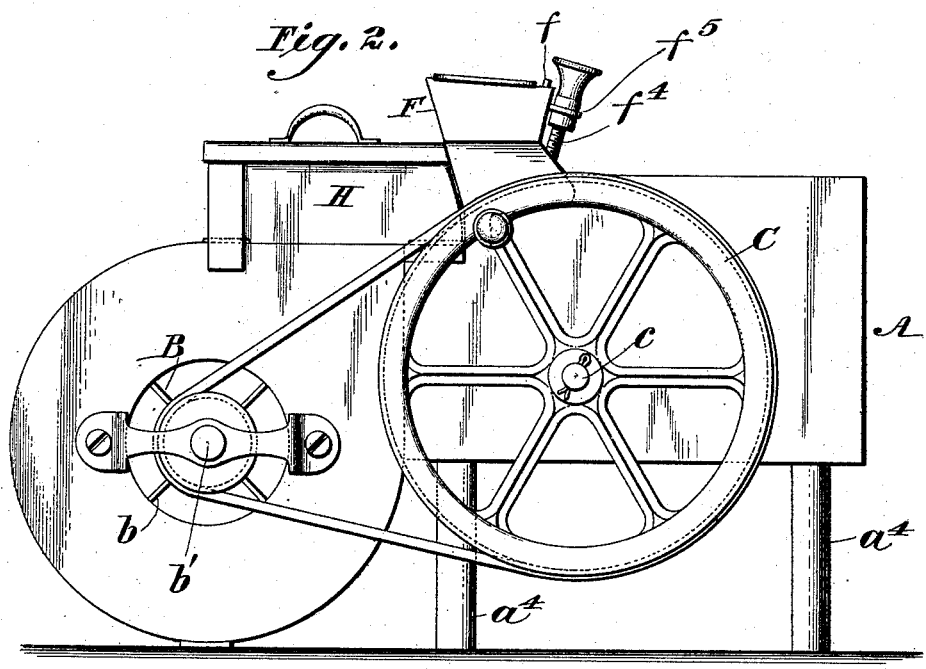
Witnesses:
John R. Nolan
C. H. Beck
Inventor:
Joseph Dover (No Model.) 2 Sheets—Sheet 2.

J. DOVER.
APPARATUS FOR AERATING MILK.

No. 469,500. Patented Feb. 23, 1892.

Witnesses:

Inventor:
Joseph Dover

UNITED STATES PATENT OFFICE.

JOSEPH DOVER, OF SOUDERTON, PENNSYLVANIA.

APPARATUS FOR AERATING MILK.

SPECIFICATION forming part of Letters Patent No. 469,500, dated February 23, 1892.

Application filed September 5, 1891. Serial No. 404,845. (No model.)

*To all whom it may concern:*

Be it known that I, JOSEPH DOVER, a citizen of the United States, residing at Souderton, Montgomery county, State of Pennsylvania, have invented a certain new and useful Apparatus for Aerating and Purifying Milk, of which the following is a full, clear, and exact description, reference being had to the accompanying drawings, forming a part of this specification.

Figure 3:
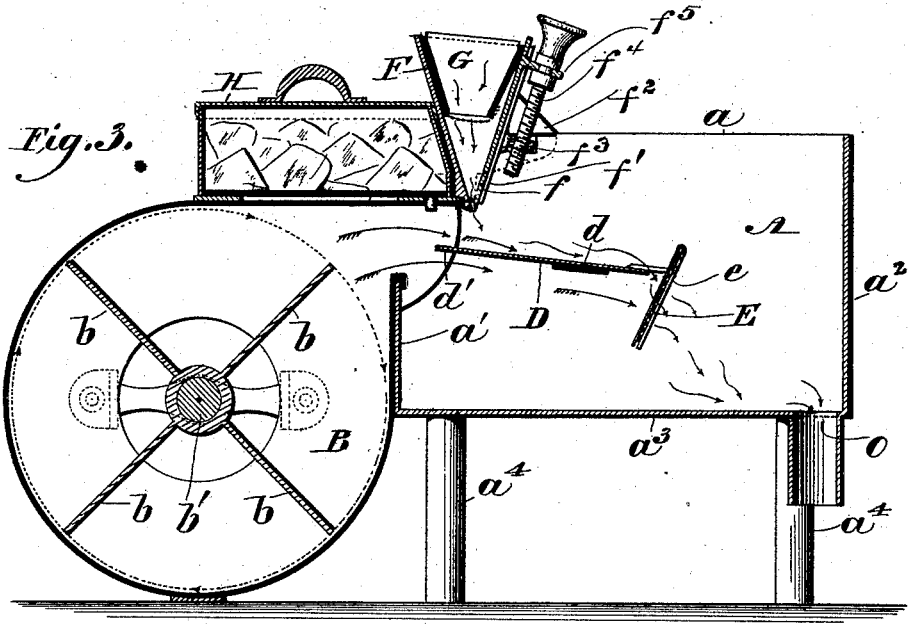
Figure 4:
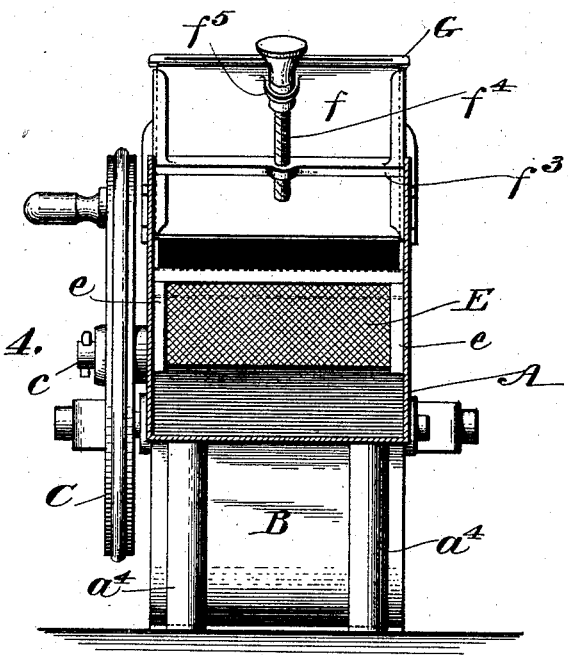

Figure 1 is a plan view of my apparatus. Fig. 2 is a side elevation thereof. Fig. 3 is a longitudinal vertical section as on the line $x$ $x$ of Fig. 1. Fig. 4 is a transverse vertical section as on the line $y$ $y$ of Fig. 1.

This invention relates to apparatus for treating milk in order to aerate, purify, and preserve the same. In carrying out the invention I employ an inclined plate or shelf upon which the milk is delivered, and a case or receiver in which said plate or shelf is supported, in combination with an air-supply device, so disposed in respect to the plate or shelf as to discharge the air-blast along each side thereof—that is, across the top and bottom surfaces thereof—and an inclined screen or separating-plate mounted at or in close proximity to the outer or rear end of the plate in a manner to receive the milk as the latter flows from said plate, whereby the divided current of air contacts with the stream of flowing milk on each side thereof and is thoroughly commingled with the milk, as hereinafter explained.

The invention comprises various novel features of construction shown in the various figures of the drawings, whereby advantages are gained, as hereinafter more particularly mentioned.

Referring to the annexed drawings, A represents a case or receiver of any proper shape and size for its intended use. In the present instance the structure is box-shaped, comprising two side walls $a$, two end walls $a'$ $a^2$, and a bottom $a^3$, the whole being supported upon suitable legs or standards $a^4$.

B represents a blower or blast-fan of the kind in which a series of radial blades or wings $b$, mounted upon a shaft $b'$, are rotated within a suitable casing. The fan is so mounted in relation to the receiver that the former discharges into the latter, the forward end wall $a'$ of the receiver being constructed as shown to permit the mouth of the fan to enter the receiver. Mounted upon a stud $c$, on the side of the receiver is a large driving-wheel C, which is belted with a small wheel C' upon the fan-shaft, whereby the latter is driven at a high rate of speed when the wheel C is rotated. This may be done by hand or other power. The fan and the receiver are preferably detachably connected, so that they may be separated as occasion requires. It is obvious that a different form of blower may be adopted to deliver the air-supply to the mouth of the receiver, and likewise a substitute for the driving mechanism shown.

Arranged within the receiver, so as to extend slightly underneath the top of the fan-case and about midway laterally of its mouth, is a transverse shelf or plate D, which is supported in the present instance upon lugs $d$ on the sides of the receiver and in kerfs or recesses $d'$ in the ends of the fan-case. By this construction of supporting devices the plate may be attached to or detached from the structure, as desired, for cleaning or other purposes. Said plate, it will be noticed, inclines very slightly from its forward to its rearward end, so that if a liquid be discharged upon its forward end the liquid will naturally flow downward on the plate, and said plate has the effect to spread the received stream of milk into a thin film or sheet. This plate has a double function, first, of receiving and spreading the stream of milk into a thin film, and, second, of dividing the current of air and directing the divided currents against the top and bottom sides, respectively, of the film of discharged milk. Fitted to inclined guideways $e$ in the sides of the receiver, just beyond the rear edge of the plate D, is a screen-frame E of a reticulated material. This screen is constructed to be slid into or out of the guideways and its inclined disposition is such that its lower portion extends under the rear edge of the plate in such manner that the above-mentioned liquid, as it flows over the plate will run upon or in close proximity to the forward face of the screen.

F represents a hopper, which is mounted at the forward end of the receiver at the junction of the latter with the mouth of the fan. This hopper is detachably supported upon the walls of the receiver, so that the hopper may be applied to or removed from the apparatus at will. Said hopper is of the V pattern, and it is so arranged as to discharge its contents upon the lower inclined shelf or plate D. One side $f$ of this hopper is mounted in guideways $f'$ in the end walls of the device, so that said side may be adjusted vertically in order to close exit-opening in the bottom of the hopper or to vary the size of said opening, as required. As a simple and efficient means, whereby this side plate may be minutely adjusted at will and fixed in any predetermined position of adjustment, I fix to the rearwardly-projecting supporting-lugs $f^2$ on the ends of the hopper a transverse bar $f^3$, which is tapped centrally to receive a screw-rod $f^4$, that is fixed to a lug $f^5$ on the rear of said plate. It will be obvious that by properly manipulating the head of this screw-rod the end in view will be effected.

G represents a sieve or screen, the walls of which are shaped similarly to the top of the hopper, so that said sieve or screen may be placed within the top of the hopper. This sieve is provided with end lugs $g$, which rest upon the ends of the hopper when the sieve is applied thereto. The sieve may thus be applied to or removed from the hopper, to meet special requirements.

H represents an ice-receptacle, which is mounted upon the top of the fan-case in close proximity to the hopper, whereby not only is the temperature of the contents of the hopper reduced, but also that of the air on its passage to the receiver. This ice-receptacle may be of any proper construction, and its mounting be of such a nature that the receptacle may be readily applied to or removed from the structure.

The general operation, briefly described, is as follows: The milk to be treated is poured into the sieve or strainer device, hair and other foreign matter contained in the milk remaining in the device, while the milk itself flows into the hopper. Thence the milk is discharged upon the inclined plate D, running down the same in the manner above mentioned. The current of air from the fan as it enters the receiver is divided by the plate, so as to blow above and below the latter and along the top and bottom surfaces thereof. The upper blast strikes the milk as the milk leaves the hopper, thereby commingling with the milk and impelling the latter along the plate. As the milk runs over the lower or rear end of this plate the lower blast strikes the milk from below and drives it forcibly against and through the opposed screen. This division of the current of the air and its direction against both sides of the stream of milk, added to the retarding and dividing effect of the screen, thoroughly blends the air with the milk and effects a perfect aeration of the liquid. The milk thus treated is discharged through a suitable outlet O in the bottom of the receiver. Obviously this aerated milk is less susceptible to atmospheric effects than is ordinary milk, thus maintaining its freshness a greater length of time than formerly. Moreover, the milk aerated in the manner described is free from those foreign odors usually present in milk and known sometimes as "cow-smell."

Having thus described my invention, I claim as new and wish to secure by Letters Patent—

1. The combination of the receiver, the fan communicating therewith, and the supporting-plate mounted in the path of the current of air generated by said fan and adapted to divide the same into two currents and discharge it against the upper and lower sides, respectively, of the film or sheet of milk, substantially as described.

2. The combination of the receiver, the fan communicating therewith, the supporting-plate mounted in the path of the current from said fan and operating to divide said current and deliver it against opposite sides of the film of milk, and the retarding and dividing screen disposed in respect to the rear edge of said plate, substantially as described.

3. The combination of the receiver, the fan communicating therewith, the supporting-plate mounted in the path of the current from said fan and operating to divide said current and deliver it against opposite sides of the film of milk, and the hopper mounted in respect to said plate, one side of said hopper being adjustable and being provided with means for adjustment, substantially as described.

4. The combination, with the hopper-frame, of a vertically-adjustable side plate $f$, guideways $f'$, in which the same may slide vertically, and mechanism to so operate the said plate consisting of a tapped bar $f^3$, supporting-lugs $f^2$ therefor on the ends of the hopper-frame, a screw-rod $f^4$, and its supporting-lug $f^5$, secured to the outer surface of said sliding plate $f$, constructed and operating substantially as described.

In testimony whereof I have hereunto affixed my signature this 1st day of September, A. D. 1891.

JOSEPH DOVER.

Witnesses:
JOHN R. NOLAN,
H. T. FENTON.